United States Patent Office 3,445,066
Patented May 20, 1969

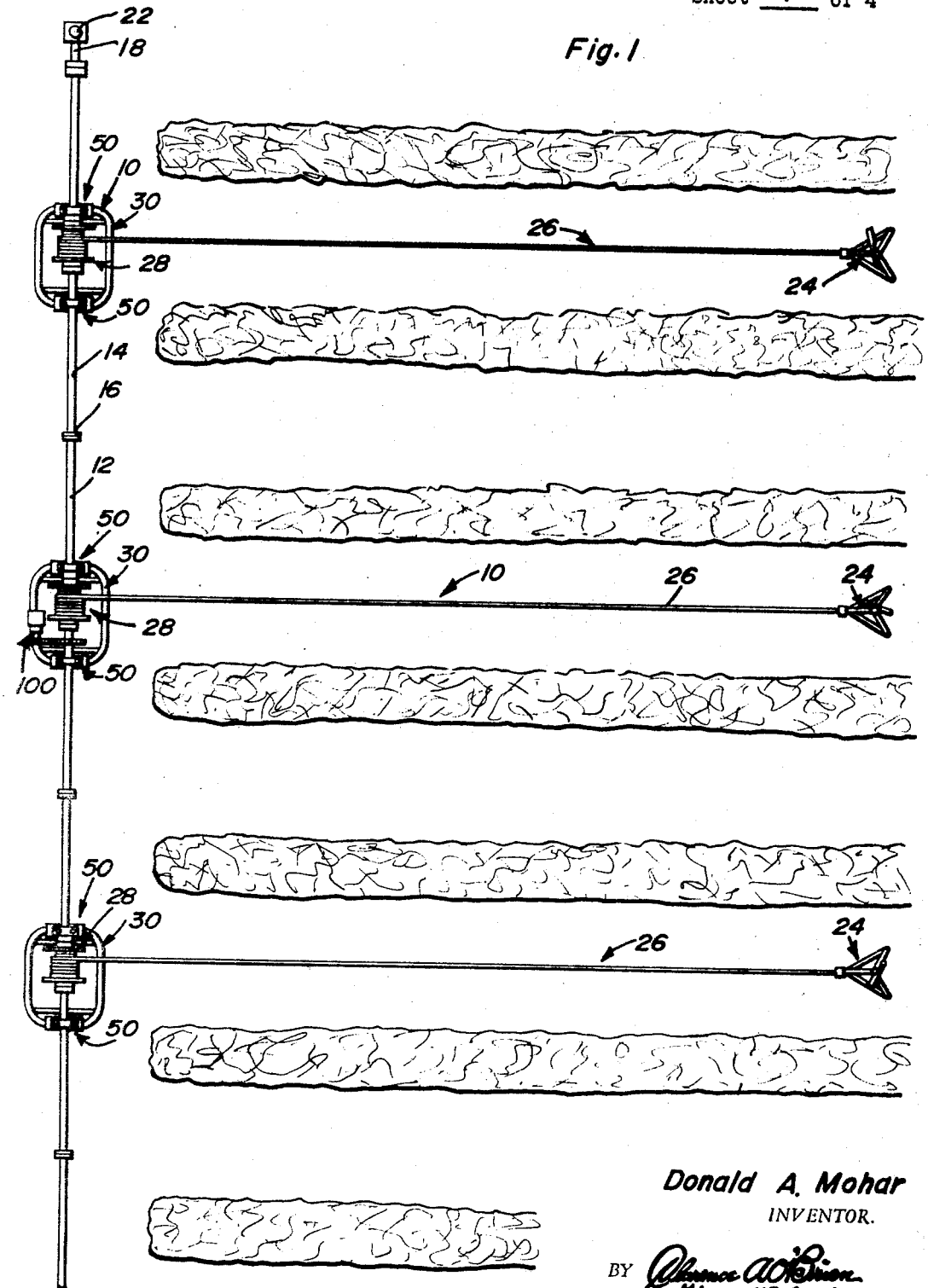

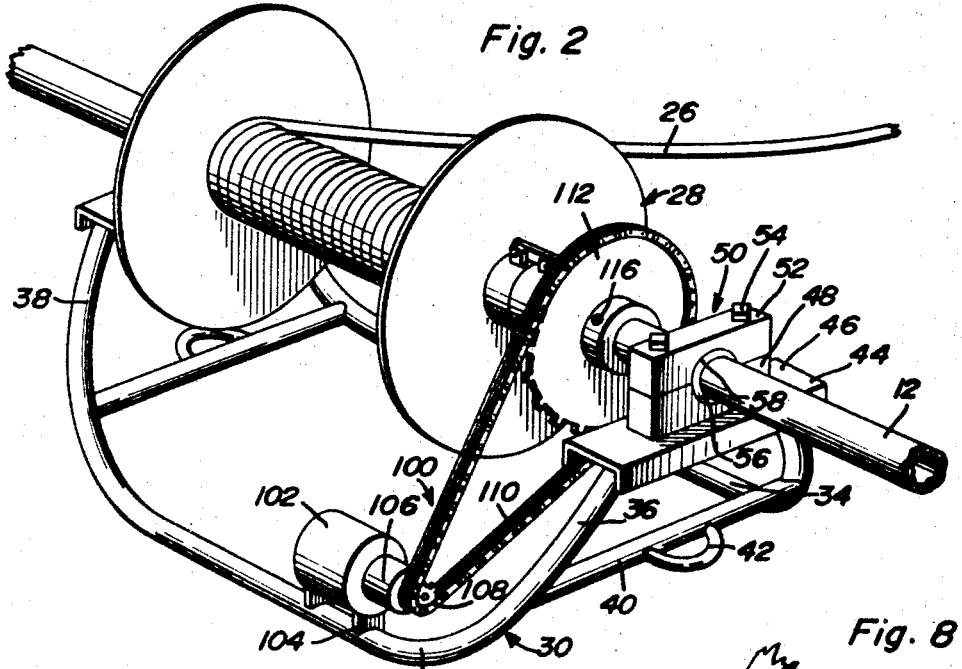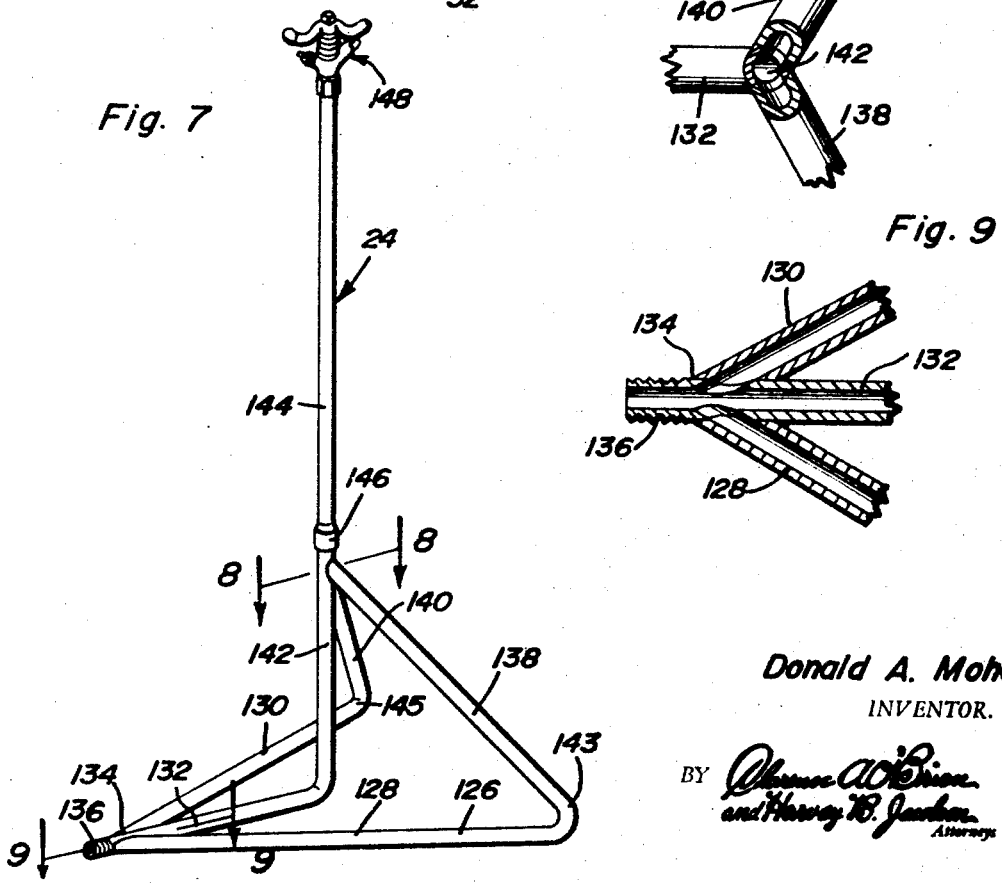

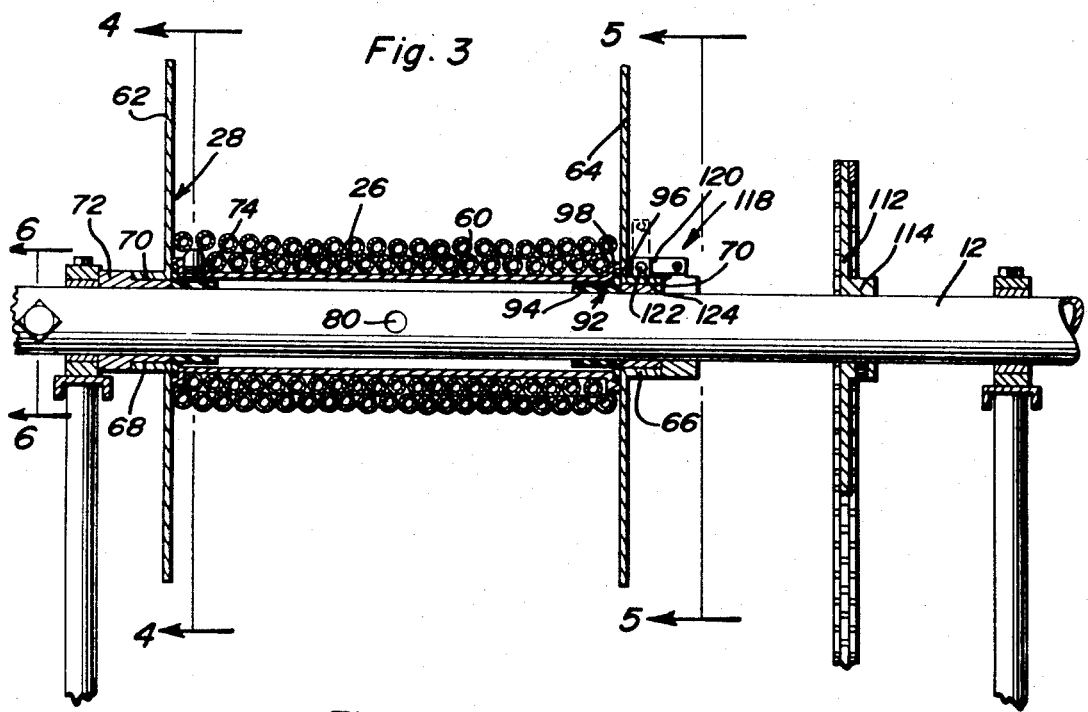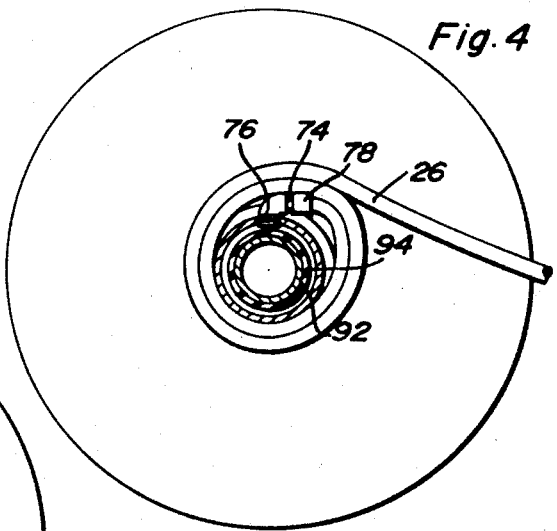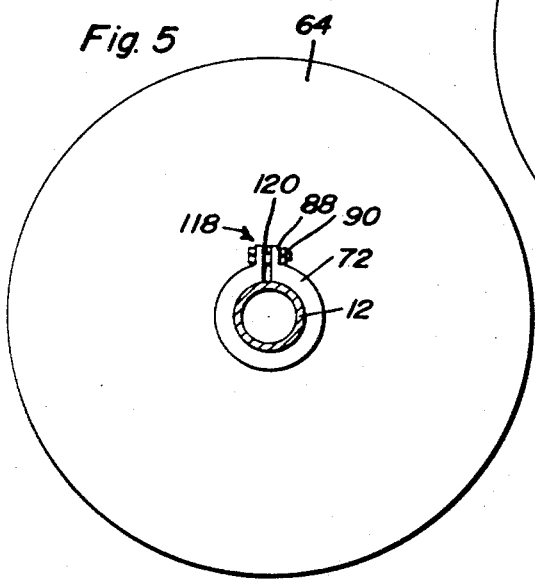

3,445,066
WATER SPRINKLER SYSTEM
Donald A. Mohar, Rte. 1, Box 378A,
Grandview, Wash. 98930
Filed Dec. 2, 1966, Ser. No. 598,798
Int. Cl. B05b 3/00, 3/18, 15/06
U.S. Cl. 239—189                        25 Claims

ABSTRACT OF THE DISCLOSURE

An elongated rigid rotatably mounted water conveying pipe mounting a series of hose reels at selected points along the length thereof. Each of the reels is rotatable independent of the pipe for enabling an extension of the sprinkler carrying hoses thereon laterally outward from the pipe. Each of the reels is also selectively lockable to the pipe for rotation therewith so as to effect a simultaneous inward reeling of the sprinkler bearing hoses during the sprinkling operation.

---

This invention generally appertains to improvements in irrigation systems and more particularly relates to a novel sprinkler system for large field usage to uniformly water a large agricultural field area for effecting complete and uniform water distribution over the crops, irrespective of the growing nature thereof, planted in the field area.

An important object of the present invention is to provide an adjustable sprinkler system which can be adjusted easily and quickly both longitudinally and laterally of an agricultural field and which is designed primarily, though not restrictively, for use in watering extremely large field acreage, as opposed to known small mobile walking-type devices or systems intended primarily for sprinkling small plots, such as lawns and relatively small fields.

A meritorious feature of the present invention resides in the provision of a single water conveying pipe or conduit, which is adapted to be connected to a high pressure source of water, and which is supported in a horizontal position, laterally of a relatively large field area, by ground engaging means that can be adjusted into various arrangements along the longitudinal axis of the pipe and to provide in association with such means, utilizable for bodily moving the pipe easily from one field area to another, hose and spool or reel arrangements with sprinkler means associated with the hoses and the spools or reels being adjustable along the longitudinal axis of the pipe.

Another meritorious feature of the present invention is to provide means for mounting and rotating such supply pipe or conduit and to provide means whereby the rotation of the pipe is effectively and efficiently transferred to the spools or reels for the purpose of reeling in the hoses and thereby adjusting the positions of the sprinklers relative to their displacement outwardly from and laterally of the pipe.

Another important object of the present invention is to obviate the necessity to close off or shutdown the water when changing the positions of the sprinklers and, in fact, to utilize such continuing water pressure as a means whereby the spools are effectively and securely rotated under rotation imparted to the pipe.

Another important object of the present invention is to provide a mobile sprinkler system which requires much less manual labor and is much less expensive to operate and control, with regard to the adjustment of the positioning of the sprinklers, which are designed so that they can effectively operate in any soil conditions and irrespective of the nature of the crops, that is with respect to the pipe, spacement and the like and to insure that through the rotative power imparted to the pipe and then through a torque transmitting means to the spools or reels that the sprinklers will not become mired down or clogged even after a considerable number of usage hours.

A further meritorious feature of the present invention resides in the provision of a single conduit or pipe adapted to be connected to a high pressure source of water and which is mounted for rotation about its longitudinal axis as well as conveyance from one field to another, by virtue of longitudinally adjustable ground-engaging sleds or runners, and on which spools or reels are fixedly circumposed in a manner so that water from the pipe enters flexible hoses carried by the spools or reels and is conveyed by the hoses to springlers which are provided with an extremely effective runner or slide arrangement whereby they will not be subject to tipping or toppling and will be positively moved toward the pipe under rotation of the pipe which is transmitted to the spools in a novel clutch and seal means between the spools or reels and the pipe so that the water pressure is utilized to establish by virtue of such clutch-seal means a positive drive connection between the pipe and the reels or spools.

A further meritorious feature of the present invention resides in the provision of a mounting arrangement for the runners or sleds and for the spools and reels whereby the same may be adjusted along the longitudinal axis of the pipe and whereby the spacing between the spools or reels can be adjusted to suit or fit different field and crop conditions with the spools or reels, once having been fixed in the desired position, being coactive with the pipe for the conveyance of water to the associated flexible hoses and for the reeling in of the sprinkler means on the outer ends of such hoses.

Another meritorious feature of the present invention resides in the provision of a more positive drive connection between the rotatable water conveying pipe and the reels or spools circumposed thereon if there is any tendency for the sprinklers to become mired down so that more torque or power is needed to rotate the reels or spools in association with the driven pipe than can be supplied, under normal operating conditions, by the clutch-seal connection means between the spools or reels and the pipe.

A still further important object of the present invention is to provide a very simple, compact, inexpensive, extremely safe and durable water sprinkler system which will operate effectively and efficiently in large fields with the minimum amount of supervision and with the expenditure of the minimum amount of labor and under extremely inexpensive operating and maintenance costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a portion of the sprinkler system constructed in accordance with this invention and showing the same in operation with row crops;

FIGURE 2 is a view in perspective of one of the spools or reels and pipe supporting runner or sled arrangement and illustrating also the power actuated means for rotating the pipe and, in turn, the spools or reels which are fixed thereon, as shown in FIGURE 1;

FIGURE 3 is a detailed vertical sectional view of the spool or reel shown in FIGURE 2 and illustrating, in particular, the clutch-seal arrangement and also the more positive drive connection means between the pipe and the spool, which is representative of the construction of the reels or spools mounted on the water pipe;

FIGURE 4 is a cross-sectional view, taken substantially on line 4—4 of FIGURE 3;

FIGURE 5 is a cross-sectional view, taken substantially on line 5—5 of FIGURE 3;

FIGURE 6 is a cross-sectional view, taken substantially on line 6—6 of FIGURE 3;

FIGURE 7 is a perspective view of one of the sprinklers;

FIGURE 8 is a detailed cross-sectional view, taken substantially on line 8—8 of FIGURE 7;

FIGURE 9 is a detailed cross-sectional view, taken substantially on line 9—9 of FIGURE 7;

Figure 10:
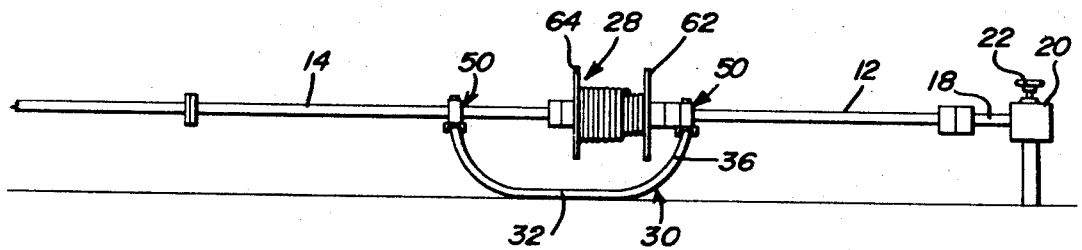
FIGURE 10 is a fragmentary front elevational view, showing the sled or runner construction for the supply pipe, and, FIGURE 11 is an end elevational view of such sled or runner construction.
Figure 11:
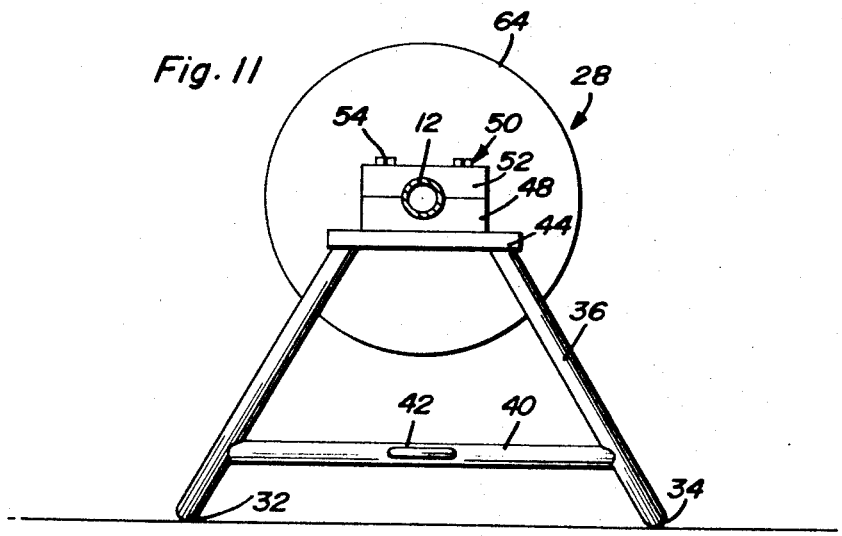

Referring now more particularly to the accompanying drawings, the mobile sprinkler system, generally designated by the reference numeral 10 includes an elongated pipe or conduit 12, which is in actuality made up of a number of sections 14 that are connected in end to end continuous axially aligned arrangement by watertight couplings 16 whereby the sections 14 are disposed in end to end fixed engagement to constitute any desired length single elongated, rigid pipe or conduit 12. The pipe or conduit 12 is connected at one end portion, such as the end portion 18, to a source 20 of water under high pressure, as caused by the use of a pump (not shown), with the water conveyance into the pipe or conduit 12 being controlled by a hand valve 22, though other valve control means may be employed for closing off the pressure forced water into the pipe or conduit 12.

As shown generally in FIGURE 1, it is proposed that a plurality of sprinklers 24, shown in greater detail in FIGURES 7 through 9 and to be described, are attached to the outer ends of flexible hoses 26 whereby the sprinklers 24 may be disposed in any given spaced apart relationship, laterally of the field and with the hoses 26 extending normally from the water pipe or conduit 12. Any number of sprinklers 24 may be provided and one of the important features of the present invention is that the water pipe 12 can be made of an extremely long length so that a large number of sprinklers 24 may be utilized whereby a large field area may be watered.

The flexible hoses 26 are coiled on spools or reels 28, one of which is shown in detail in FIGURES 2 and 3. The rigid water pipe 12, irrespective of the number of interconnected and axially aligned sections 14, is formed so that each pipe section 14 is supported in a horizontal position with the sections in alignment and being coplanarly arranged and with each section supporting a spool or reel 28.

As shown in FIGURE 2, the pipe 12 is supported, preferably at each of its sections 14, by a ground-engaging sled or runner assembly 30, which is composed of tubular stock and includes a pair of ground-engaging runner or sled portions 32 and 34 which have upwardly curved and bowed end portions 36 and 38. Reinforcing cross brace rods 40 are provided at the ends and are formed with hooks 42 whereby means may be attached or applied for the purpose of moving the ground-engaging runners or sleds 30 with their ground-engaging runner portions 32 and 34 sliding on the ground. The upper portions of the opposing upstanding end sections 36 and 38 are interconnected or attached by plates 44, which may be of channel-like cross-sectional shape and which have base portions 46 on which the lower fixed jaw section 48 of a clamping jaw assembly 50 is secured, the fixed section 48 being complemental to and cooperative with a removable upper section 52 which is bolted thereon by means of bolts 54. The inner confronting faces of the clamping jaw sections are formed with arcuate or semi-curved cutout portions or recesses 56 for the purpose of accommodating a bearing collar 58 within which the pipe or conduit 12, bearing in mind that such encompasses the sections 14, is rotatably disposed.

The spool or reel 28, as shown more particularly in FIGURE 3, comprises a cylindrical hub portion 60 which is disposed concentrically of the pipe 12 and is radially spaced out of direct contact therewith. The spool or reel 28 further includes annular end plates or disks 62 and 64 provided at the opposing ends of the hub portion 60. The plates or disks 62 and 64 have annular hub portions 66 and 68 which are seated in annular grooves 70 formed in the outer wall of collars 72 that are fixedly clamped on the pipe 12 by a simple clamping arrangement, with the collars being axially split. Thus, the collars 72 which are integrated with the hub portions 68 of the end plates or disks 62 and 64 of the reel or spool 28 are clamped on the pipe so that the entire spool can be secured in a positive manner on the pipe but may be adjusted along the longitudinal axis thereof for the purpose of spacing the sprinklers 24 relative to each other and to the field area.

The hub portion 60 of each reel or spool is provided with a threaded port 74 in which the threaded end of the nipple 76 is fixed with the inner end of the hose 26 being suitably coupled by a coupling means 78 to the nipple whereby water from the interior of the pipe under the high pressure, as supplied by a pump or other means, is forced into the hose 26.

As a matter of adjustment of the spools or reels 28 along the longitudinal extent or axis of the pipe 12, the pipe is formed with a number of longitudinally spaced threaded radial ports or bores 80, as shown in FIGURE 3, whereby water can issue from the interior of the pipe and through the nipple connection pass under a high pressure to and through a hose 26.

As shown in FIGURE 6, when the various ports 80 in the pipe 12 are not in use, that is, when the spools or reels 28 have been moved into selected adjusted positions along the longitudinal axis of the pipe or conduit 12, plugs 82 are provided which sealingly close off the ports 80, the plugs having exteriorily threaded shank portions 84 which fit tightly within the ports or bores 80 and have head portions 86 whereby a wrench or other tool may be used to secure them in positions.

It can be appreciated that by virtue of the particular sled or runner support assembly 30, the spools or reels 28 can be moved into various positions and that the pipe 12 can be supported at various positions with the ground-engaging runner or sled means 30 being associated with each of the spools or reels 28 so as to support the pipe 12 at the points of greatest strain which would be where the spools or reels 28 are located and it is to be noted, in this respect, that the bearing support arrangement for the pipe 12 is disposed at and adjacent to the disks or end plates 62 and 64 of the reels or spools, as clearly illustrated in FIGURES 2 and 3. Thus, the sled assembly is disposed subjacent each reel 28 to insure proper support for the pipe or conduit 12. As shown in FIGURE 5, the collars 72 are axially split and have confronting apertured flanges 88 which are bound together by a bolt assembly 90.

It is to be noted that the pipe 12 is mounted for rotation about its longitudinal axis and that the spools or reels 28 are fixed thereon, though adjustable along the longitudinal extent thereof. However, the spools or reels are fixedly circumposed on the pipe or conduit 12 so that rotation of the pipe or conduit 12 is transmitted to the reels or spools 28 by virtue of the provision of a clutch-seal arrangement 92, as shown more particularly in FIGURE 3. The clutch-seal arrangement 92 comprises the provision of a resilient collar 94, which may be formed from Neoprene rubber, plastic or the like sturdy, resilient and durable material. The collar 94 is tightly sleeved or circumposed on the pipe and is provided with an annular radially outstanding end flange 96, which radiates from the pipe 12 and which is tightly fitted between the right angular end portions 98 of the hub 60 and the inner ends of the collars 72 and the associated inner ends of the disks or plates 62 and 64. The flanges 96 are tightly wedged between such portions so as to provide a decided and definite water seal whereby water issuing from the apertures or ports 80 cannot leak out through the ends of the hub portion 60 of the reel or spool 28 and whereby, virtue of the water pressure existing within the radial space between the pipe and the hub portion 60 and the coacting water pressure existing in the coiled portions of the hose 26 securely adheres in an integral fashion the spools or reels 28 on the pipe so that the same provides a clutch means active during the presence of the water pressure for the transmittal of rotative movements of the pipe 12 to the spools so as to effect a reeling in of the hose 26 onto the hub portion 60 of each of the spools.

It has been found that only one of the reels, usually the center one, as shown in FIGURES 1 and 2, need be provided with a power means 100 for effecting the rotary movements of the pipe 12 and the consequent and attendant rotation of the reels or spools 28.

The drive means 100 preferably includes an electric motor 102 which is mounted by a supporting structure 104 on the ground-engaging runner 32 and which through a suitable gear reduction assembly 106 drives a small sprocket 108 around which a chain 100 is entrained. The chain is entrained around a relatively large sprocket wheel 112 which has a hub portion 114 fixedly but adjustably circumposed on the pipe or conduit 12, as by means of a radial setscrew 116.

It can thus be appreciated that when the motor 102 is energized, as can be done by means of a push button control or can be automatically effected by a switch means operative under varying conditions, as for example by virtue of the provision of timer unit limit switches or the like, the drive chain 110 is operative to rotate the pipe or conduit 12 and through the clutch-seal assemblies 92 rotate the reels or spools 28 and thereby reel in or wind up the flexible hose onto the hub portion 60 of each of the associated reels or spools 28.

Under certain conditions, the sprinklers 24 may have a tendency to become mired down and, therefore, a more positive torque transmitting connection 118 is provided between the spools and the pipe 12, as shown in FIGURES 2 and 3. Such connection includes the provision of a link 120, which is rotatably or pivotally mounted at one end on a pivot pin 122 which is carried between a pair of ears 124 on the hub portion of one of the end plates or disks 64 and which is adapted to be swung so that its opposing apertured end can be clamped by the bolt assembly 90, as shown in FIGURE 5, between the clamping ears 88 of the associated split collar 72 that is clamped by virtue of the bolt assembly 90 tightly onto the shaft 12. Therefore, by virtue of this arrangement, it can be appreciated that a direct and positive drive connection or arrangement is provided whereby positive non-slippage torque is transmitted from the rotating pipe 12 to the spools or reels 28.

However, under normal operating conditions, the clutch-seal arrangement 92 will be satisfactory for establishing a drive connection between the spools or reels 28 and the rotating pipe or conduit 12.

As shown in FIGURES 7 through 9, the sprinklers are constructed so that they are extremely well balanced under water influencing and stabilizing conditions and will not tip or topple over as they are moved inwardly toward the pipe or conduit 12 under the drive arrangement aforedescribed. Each of the sprinklers 24 comprises a base stand 126 which is composed of divergent triangularly related tubular pipe sections 128 and 130 which are joined together with a center pipe section 132, the same being horizontally arranged for ground sliding engagement. The pipe sections 128, 130 and 132 are coplanary arranged and have integrally associated end portions which are connected at a juncture point 134 that is provided with an externally threaded nipple 136 to which the outer end of the flexible hose 26 is attached.

The outwardly divergent pipe portions 128 and 130, which constitute the sides of the base stand have upwardly and rearwardly extending and divergent vertical sections 138 and 140 which are joined to the vertical stem portion 142 that upstands substantially at right angles from the inner end of the center pipe section 132 and is disposed within the confines of the bends 143 and 145. The stem section 142 is substantially perpendicular and has an upper end portion to which a tubular pipe section 144 is coupled, as at 146. The tubular pipe section 144 terminates in an upper rotatable sprinkler head assembly 148, as shown in FIGURE 7, which sprinkler head assembly rotates, as in conventional practice, under the pressure of the water.

It can be appreciated that the water pressure holds the tubular base sections of the base stand 126 in firm ground engagement and permits them to slide freely, as they are drawn in by the spools or reels 28 under the rotary impetus of the pipe or conduit 12 and through the drive connection, as aforedescribed or by any other means whereby each sprinkler 24 is moved, either individually or whereby the sprinklers are moved as a unit in structural consort.

In the operation of the sprinkler system 10, the sleds or ground-engaging supporting runners 30 are fixed by the clamping means 50 to the single pipe or conduit 12 and through the use of the hook arrangement 42, the entire assembly can be drafted by a tractor or other traction vehicle and the pipe 12 with any number of sections 14 and any number of ground-engaging sleds or runners 30 and associated spools or reels 28 can be disposed so that one end thereof is attachable in a simple and most expeditious manner to the source 20 of water under high pressure, which is produced by a pump or the like (not shown). After the pipe 12 has been disposed so that it is arranged laterally or transversely of the field, the sleds or runners 30 which are associated in supporting arrangement with the individual spools or reels 28 can be moved along the longitudinal extent of the pipe 12 so as to dispose the reel in the desired relationship, one of which is illustrated merely for exemplary purposes in FIGURE 1. Obviously, the ports or apertures 80 which are employed because of a particular arrangement of the reels 28 will be closed off by the closure plugs, as shown in FIGURE 6. However, the intended useful ports or apertures will be related to the reels or spools 28, as shown in FIGURES 3 and 4, so that the associated flexible hoses will be attached to the water pipe and the ports 80 will be related functionally to the ports 74 and the radial spacing of the circumposed hub portions 60 of the reels or spools 28, as shown in FIGURE 3.

The valve means 22 is closed so that there is no water pressure in the pipe or conduit 12, and, therefore, the spools or reels may freely rotate on the pipe or conduit 12 whereby the sprinklers 24 may be moved into the desired positions by manually drawing them outwardly with the flexible hoses 26 unreeling from the freely rotating spools or reels 28. When the sprinklers 24 have been oriented in the desired relationship from the water pipe 12 and with respect to the field acreage, then the valve means 22 is actuated to establish a high pressure water flow in the water pipe 12 which water is conveyed by virtue of the ports or apertures 80 and 74 through the extended hoses 26 and into the sprinklers 24 and the water rotates the sprinkler heads 148 and is cast over the entire intended field acreage.

As the intended field acreage, remote from the water pipe or conduit 12, has become sufficiently saturated, the power means 100 is rendered operative, either by manually throwing an on-off switch for the motor 102 or by virtue of a timer means for energizing the motor or a limit switch means, which may be located in the vicinity of the sprinklers 24 so as to discontinue the withdrawal or inward movement of the sprinklers under given conditions.

In any event, the pipe 12 is rotated by the power means 100 and through the clutch-seal arrangement 92 the rotary movements of the pipe or conduit 12 is transmitted to the individual and spaced apart, separate reels or spools 28 whereby they function in a common relationship to reel in the flexible hoses 26 for a sufficient distance to re-position the sprinklers 24 closer to the water pipe 12. The power means 100 is then discontinued and the sprinklers are permitted to remain in operation. At all times the pipe or conduit 12 continues to convey water under high pressure and it is by virtue of this that the clutch-seal means 92 is operative to structurally relate or integrate the spools or reels 28 with the pipe 12 so that they are rotated thereby. However, under some dire conditions, where the sprinklers 24 may become mired down, the positive drive connection 118 may be placed in operation. In any event, the sprinklers are permitted to continue to operate with a constant water flow and are drawn inwardly toward the water pipe 12 until they reach a position where they are in adjacency thereto, whereupon the valve means 22 is actuated so as to discontinue the operation. At this time, the entire unit may be moved to another field or may be left in non-operative disposition for operation in the same field at a later time.

The most important structural factor is that the pipe 12 does not bodily move, even though it may rotate, but instead, through any connection means or drive arrangement the sprinklers 24 are drawn, under a positive action toward the pipe which constitutes a sole and single distributing component for a plurality of sprinklers so that the sprinklers walk toward the pipe or conduit, even though the latter may be positioned at various water outlets in a field.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A water sprinkler system for large field use comprising a rigid tubular pipe adapted to be connected to a source of water under pressure, ground-engaging means supporting the pipe, reel means carried by the pipe at selective points along the longitudinal extent thereof in communication with the interior of the pipe, flexible hoses carried by the reel means, sprinkler means structurally associated with said hoses and positionable at points laterally remote from the pipe under extension of the hoses, said pipe being supported for bodily rotation about its longitudinal axis, drive means for rotating said pipe, and means for connecting the reel means to the pipe for selective rotation therewith.

2. The invention of claim 1, wherein said means connecting the reel means to the pipe is operative so that the reel means is freely rotatable in the absence of water pressure in the pipe for extension of the sprinklers and hoses therefrom and is rotated with the pipe during the existence of water pressure in the pipe so as to reel in the hoses and the sprinklers, the latter being bodily movable toward the pipe.

3. A water sprinkler system for large field use comprising an elongated tubular pipe adapted to be connected at one end to a source of water under pressure, ground-engaging means disposed at selective points along the longitudinal extent of the pipe for supporting the pipe for bodily longitudinal movement in disassociation with the source of water under pressure and for supporting the pipe for rotation about its longitudinal axis in its association with the source of water under pressure, a plurality of reels circumposed on the pipe, means establishing an integral structural association with the reels and the pipe in the presence of water pressure in the pipe and permitting independent free rotative movements of the reels on the pipe in the absence of such water pressure, flexible hoses carried by the reels, sprinkler means structurally associated with the hoses and positionable at points laterally remote from the pipe under extension of the hoses and said sprinkler means being automatically drawn inwardly toward the pipe under the rotary movement of the pipe and associated rotary movements of the reel means so as to dispose the sprinkler means at selected points in their positions remote laterally from the longitudinal extent of the pipe.

4. The invention of claim 3, wherein said ground-engaging means constitutes ground-engaging sleds having ground-engaging portions disposed parallel to the lonitudinal axis of the pipe.

5. The invention of claim 4, wherein bearing means is carried by the sleds for rotatably supporting the pipe for rotation about its longitudinal axis.

6. The invention of claim 5 wherein said sleds are adjustable along the longitudinal extent of the pipe.

7. The invention of claim 6 wherein said bearing means includes a clamping arrangement and a bearing assembly associated therewith whereby the sleds may be positioned at selected points along the longitudinal extent of the pipe while supporting the pipe for rotation about its longitudinal axis.

8. The invention of claim 7, wherein said reels are disposed in circumposed fashion on the pipe and are positioned within the bearing assemblies and are disposed above the sleds for maximum support of the pipe.

9. The invention of claim 8, wherein said pipe is provided with a series of radial ports and said reels include hub portions adapted to encompass such ports in spaced relation therewith with said ports being interrelated so that means is structurally associated with one of said ports for connecting the inner end of the hoses to said hub portion and means is provided for closing off certain of said ports when the hub portion is in communication with selected other of said ports.

10. The invention of claim 9, wherein said reels include a hub portion having a radial port, nipple means connected to said port and to which the inner ends of the hoses are secured with the radial ports in the pipe being in communication with the nipples, the hub portions being radially spaced from the pipe.

11. The invention of claim 10, wherein said flexible hoses are coiled on the hub portions, said reels including end plates attached to the opposing ends of the hub portion.

12. The invention of claim 11, wherein said means for rotating the pipe comprises a drive arrangement including a prime mover carried by one of the sleds and a drive connection directly between said prime mover and the pipe.

13. The invention of claim 12, wherein flexible clutch means is provided between the opposing ends of the hub portion and the pipe whereby under the water pressure existing in the pipe and the hoses coiled on the hub portions of the reels said hub portions are forced into integral structural association with the pipe so as to be rotated thereby.

14. The invention of claim 13, wherein said clutch means comprises resilient seals interposed between the end portions of the hub portions of the reels and the pipe.

15. The invention of claim 14 and further including a positive drive connection between the reels and the pipe.

16. The invention of claim 15 wherein said last means includes collars fixedly circumposed on the pipe and a structural linkage selectively connectible between one of said collars and one end of the reels.

17. The invention of claim 16, wherein said sprinklers comprise a base portion and an upstanding perpendicular tubular stem portion, a rotatable sprinkler head mounted on the upper end of said stem portion.

18. The invention of claim 16, wherein said base portion includes tubular angularly related base runners disposed in divergent relationship and angularly outstanding in horizontal positions from the vertical stem portion and providing a tripod base of horizontal tubular sections slidable on the ground.

19. The invention of claim 18 wherein said reels are adjustable along the longitudinal extent of the pipe and said supporting sleds for the pipe have ground-engaging portions and upstanding end portions carrying the bearing means with the end portions being disposed on opposite sides of the end plates of the reels so that the sleds underlie the reels.

20. In a water sprinkler system for large field operation, a rigid tubular pipe, a support assembly for said pipe, means communicating said pipe with a source of water, means securing said pipe to said support assembly for bodily rotation about its own longitudinal axis, reel means carried by said pipe, a flexible hose carried by said reel means and in water receiving communication with said pipe, said flexible hose being selectively wound onto and unwound from said reel means, and means connecting said reel means to the pipe for selective rotation therewith, said means for connecting the reel means and pipe providing for free rotation of the reel means relative to the pipe in the absence of water pressure in the pipe for extension of the hose therefrom, and a locked relationship between said reel means and pipe during the existence of water pressure in the pipe whereby a reeling in of the hose upon a rotation of the pipe can be effected.

21. The invention of claim 1 wherein said ground-engaging means constitutes ground-engaging sleds having ground-engaging runners disposed parallel to the longitudinal axis of the pipe, said sleds being adjustable along the longitudinal extent of the pipe.

22. The invention of claim 21 wherein bearing means are carried by the sleds and constitute the means by which the pipe is supported for rotation about its longitudinal axis, said bearing means including a clamping arrangement and a bearing assembly associated therewith whereby the sleds may be positioned at selected points along the longitudinal extent of the pipe while supporting the pipe for rotation about its longitudinal axis.

23. The invention of claim 1 wherein said sprinkler means comprise, in each instance, a base portion and an upstanding perpendicular tubular stem portion, a rotatable sprinkler head mounted on the upper end of said stem portion, said base portion including tubular angularly related base runners disposed in divergent relationship and upwardly angled sections joined to the upstanding stem portion to define a three-point support for the sprinkler head.

24. A water sprinkler system for large field use comprising an elongated rigid tubular pipe adapted to be connected to a source of water under pressure and supported for rotation about the longitudinal axis thereof, a plurality of reels carried by the pipe at selected points along the longitudinal extent thereof, flexible hoses carried by the reels and communicated with the interior of the pipe, sprinkler means structurally associated with said hoses and positionable at points laterally remote from the pipe upon an extension of the hoses from the reels, drive means for selectively rotating said pipe, each of said reels being mounted on the pipe for rotation relative thereto, and means for selectively connecting each of said reels to the pipe for selective rotation therewith.

25. The invention of claim 24 wherein the means connecting the reels to the pipe is operative so that the reels are freely rotatable relative to the pipe in the absence of water pressure in the pipe for extension of the sprinklers and hoses therefrom and are rotated with the pipe during the existence of water pressure in the pipe so as to reel in the hoses and the sprinklers.

References Cited

UNITED STATES PATENTS

| 1,761,191 | 6/1930 | Browning | 239—189 |
| 2,518,990 | 8/1950 | Keener | 239—191 X |
| 3,094,282 | 6/1963 | Purtell | 239—189 X |
| 3,150,830 | 9/1964 | Griffith | 239—198 |
| 3,175,574 | 3/1965 | Morford | 137—355.26 |

FOREIGN PATENTS

| 158,310 | 8/1954 | Australia. |
| 978,275 | 12/1964 | Great Britain. |

OTHER REFERENCES

Perrot, Heinrich. German Auslegeschrift No. 1,222,312. Published Aug. 4, 1966.

EVERETT W. KIRBY, *Primary Examiner.*

U.S. Cl. X.R.

239—191, 197, 199, 213; 137—355.2; 242—86